(12) United States Patent
Ando

(10) Patent No.: US 11,492,011 B2
(45) Date of Patent: Nov. 8, 2022

(54) AUTONOMOUS DRIVING CONTROL DEVICE AND METHOD FOR AUTONOMOUS DRIVING CONTROL OF VEHICLES

(71) Applicant: DENSO CORPORATION, Kariya (JP)

(72) Inventor: Toshihide Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/871,343

(22) Filed: May 11, 2020

(65) Prior Publication Data

US 2020/0269876 A1 Aug. 27, 2020

Related U.S. Application Data

(63) Continuation of application No. PCT/JP2018/032456, filed on Aug. 31, 2018.

(30) Foreign Application Priority Data

Nov. 13, 2017 (JP) .............................. JP2017-218054

(51) Int. Cl.
*B60W 60/00* (2020.01)
*B60W 50/04* (2006.01)
*G07C 5/08* (2006.01)

(52) U.S. Cl.
CPC ........ *B60W 60/0024* (2020.02); *B60W 50/04* (2013.01); *B60W 60/0016* (2020.02); *B60W 60/0053* (2020.02); *B60W 60/0059* (2020.02); *B60W 60/00186* (2020.02); *G07C 5/0816* (2013.01)

(58) Field of Classification Search
CPC ......... B60W 60/0024; B60W 60/0016; B60W 60/0059; B60W 60/0053; B60W 60/00186; B60W 50/04; B60W 50/035; G07C 5/0816; G07C 5/0808; B60R 16/02
See application file for complete search history.

(56) References Cited

U.S. PATENT DOCUMENTS

| 6,463,373 | B2 * | 10/2002 | Suganuma | .......... B60R 16/0232 303/112 |
| 2007/0226726 | A1 * | 9/2007 | Robsahm | .................. G06F 8/61 717/168 |

(Continued)

FOREIGN PATENT DOCUMENTS

| CN | 104670110 A | * 6/2015 | ............ B60W 30/00 |
| JP | 6189004 B1 | * 8/2017 | ............ G06F 11/143 |
| JP | 6189004 B2 | 8/2017 | |

*Primary Examiner* — Jean Paul Cass
*Assistant Examiner* — Matthew L Parulski
(74) *Attorney, Agent, or Firm* — Maschoff Brennan

(57) ABSTRACT

An autonomous driving control device includes: a plurality of control devices that each have a first storage unit and a processing unit; a load control unit; a second storage unit; and a failure detection unit. The programs include autonomous driving programs and other programs. When a failure is detected, the load control unit unloads at least some of the other programs from the first storage unit of a normal control device, and loads the autonomous driving program corresponding to that loaded in the first storage unit of a failed control device from the second storage unit into the first storage unit of the normal control device.

10 Claims, 8 Drawing Sheets

(56) References Cited

U.S. PATENT DOCUMENTS

| | | | | |
|---|---|---|---|---|
| 2015/0142244 A1* | 5/2015 | You | ............ | B60W 60/0053 701/23 |
| 2018/0348754 A1* | 12/2018 | Samii | ............ | G05D 1/0077 |
| 2019/0340116 A1 | 11/2019 | Miyauchi | | |

* cited by examiner

<SECOND EMBODIMENT>

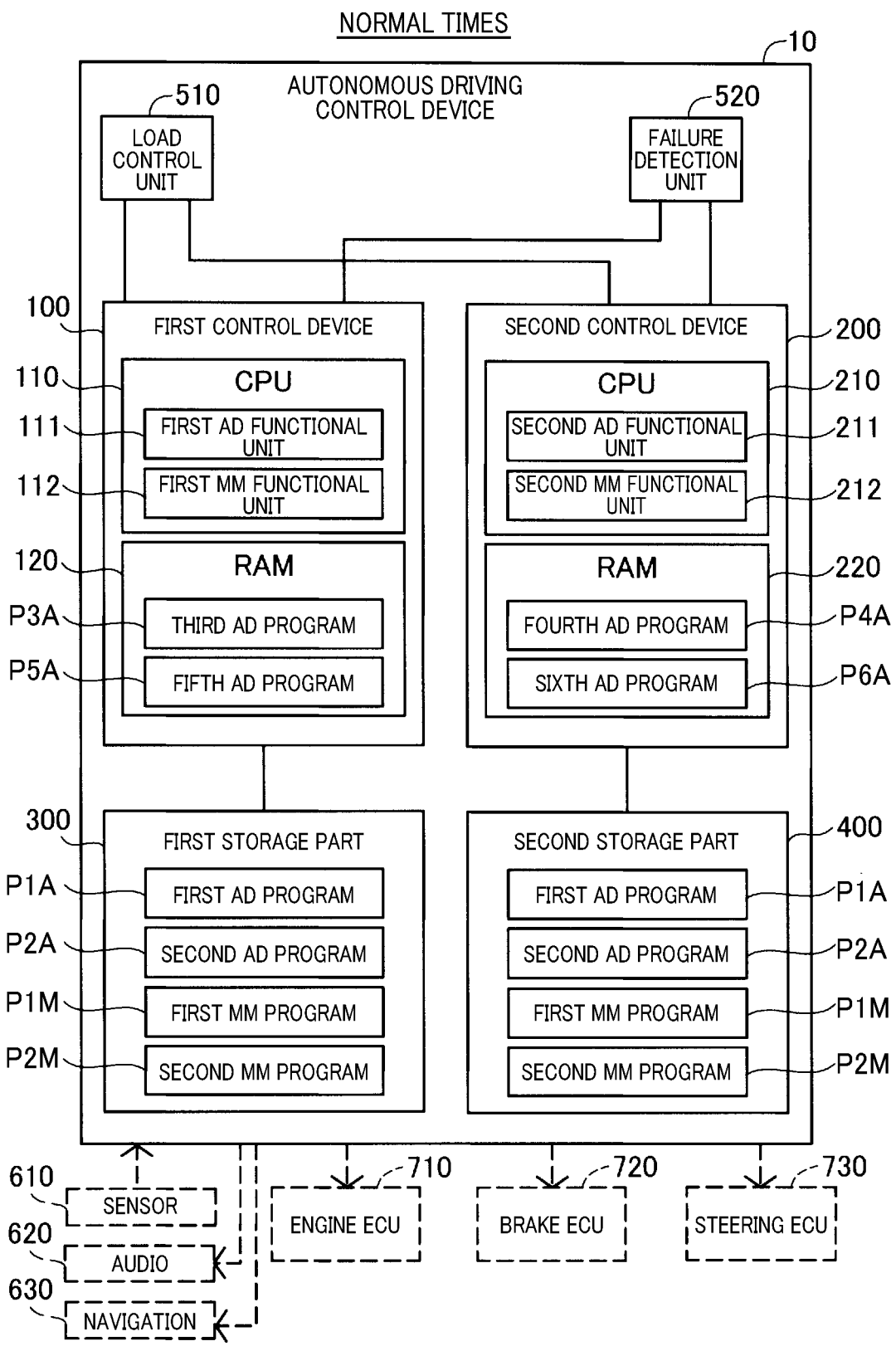

AUTONOMOUS DRIVING CONTROL DEVICE AND METHOD FOR AUTONOMOUS DRIVING CONTROL OF VEHICLES

CROSS-REFERENCE TO RELATED APPLICATION

The present application is a continuation application of International Application No. PCT/JP2018/032456 filed on Aug. 31, 2018, which claims priority to Japanese Patent Application No. 2017-218054 filed on Nov. 13, 2017. The contents of these applications are incorporated herein by reference in their entirety.

BACKGROUND

Technical Field

The present disclosure relates to an autonomous driving control device.

Background Art

In recent years, there have been proposed various autonomous driving control devices for implementing autonomous driving of vehicles, such as following a preceding vehicle or detecting an obstacle on a scheduled running route to automatically perform steering or braking, in such a manner as to avoid the obstacle. An autonomous driving control device may be implemented by a control device called an electric control unit (ECU) having a central processing unit (CPU), random access memory (RAM), and read only memory (ROM). In such a control device, autonomous driving programs stored in the ROM are loaded by the CPU into the RAM and are executed to implement various functions of autonomous driving.

SUMMARY

According to one aspect of the present disclosure, there is provided an autonomous driving control device. The autonomous driving control device includes: a plurality of control devices that each have a first storage unit and a processing unit; a load control unit that controls loading of the programs into the respective first storage unit of the plurality of control devices; a second storage unit that stores the programs; and a failure detection unit that detects a failure in at least one of control devices. The programs include autonomous driving programs of the vehicle and other programs. When a failure is detected, the load control unit unloads at least some of the other programs from the first storage unit of a normal control device, and loads the autonomous driving program corresponding to that in the first storage unit of a failed control device from the second storage unit into the first storage unit of the normal control device.

BRIEF DESCRIPTION OF THE DRAWINGS

The foregoing and other objects, features, and advantages of the present disclosure will be further clarified by the following detailed descriptions with reference to the accompanying drawings. The drawings are as follows:

FIG. 8 is a block diagram illustrating a configuration of an autonomous driving control device in another embodiment 2.

DETAILED DESCRIPTION OF THE PREFERRED EMBODIMENTS

Figure 1:
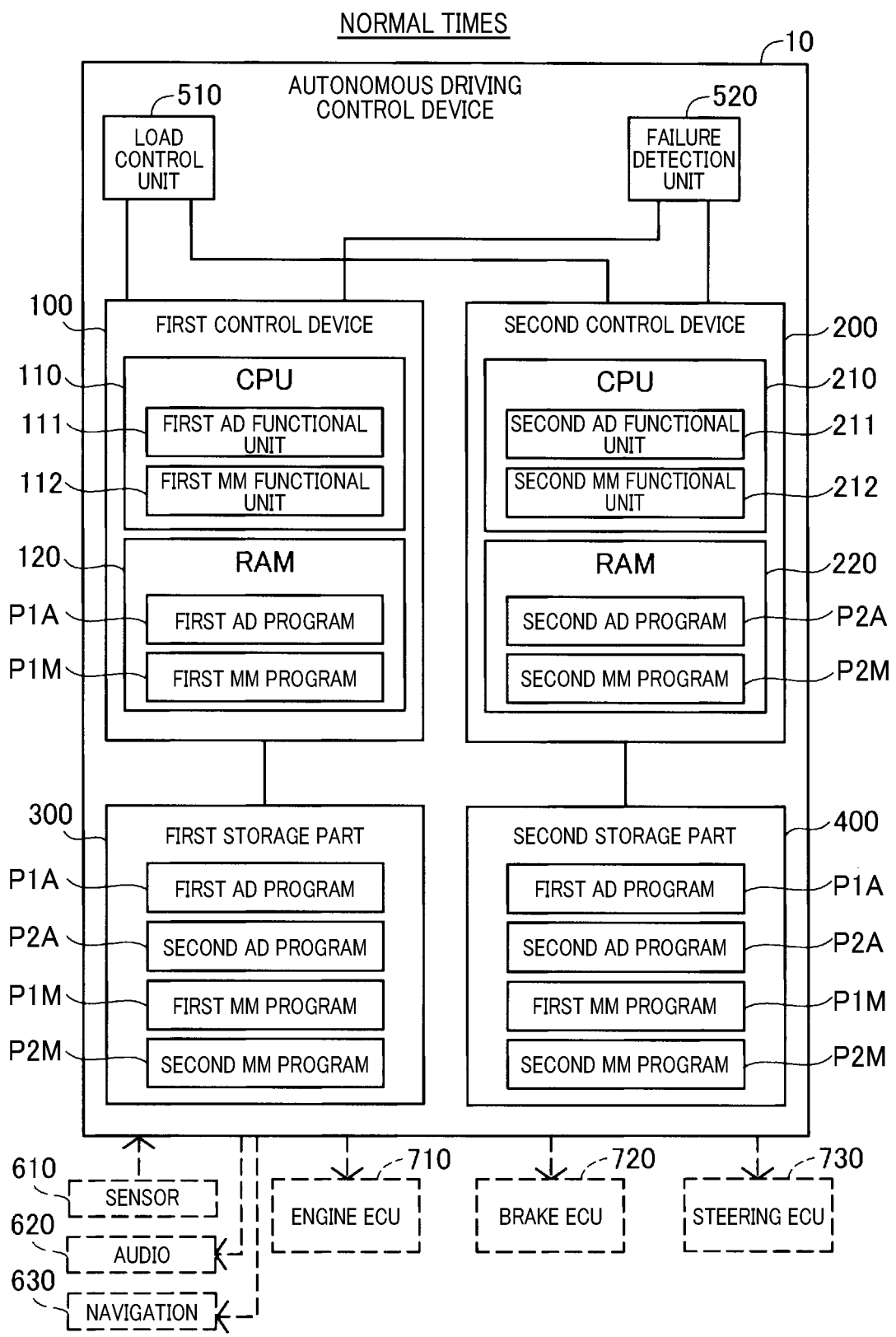
FIG. 1 is a block diagram illustrating a configuration of an autonomous driving control device as one embodiment of the present disclosure.

There is proposed a configuration of an autonomous driving control device in which, as a fail-safe in case of a failure in a control device, a shared backup ECU is prepared separately from a plurality of ECUs operating in normal times so that, if any of the ECUs fails, the shared backup ECU executes the programs that were previously being executed by the failed ECU (see JP 6189004 B). In the control system described in JP 6189004 B, out of the programs executed by the failed ECU, the programs to be loaded are selected and loaded into the shared backup ECU and executed in accordance with predetermined degrees of priority depending on the level of a risk specific to autonomous driving or such that the total load of the CPU of the shared backup ECU does not exceed the load capacity.

In the system of JP 6189004 B, the dedicated ECU (shared backup ECU) needs to be provided as a fail-safe separately from the plurality of ECUs, which may result in upsizing of the autonomous driving control device and increase of power consumption. Thus, there is demand for a technique for suppressing a decrease in the continuity of autonomous driving functions of the control device in the event of a failure and suppressing upsizing and increase in power consumption of the control device.

The present disclosure is devised to solve at least one of the foregoing issues and can be implemented in a mode described below.

According to one aspect of the present disclosure, there is provided an autonomous driving control device to be installed and used in a vehicle. The autonomous driving control device includes: a plurality of control devices that each have a first storage unit and a processing unit executing programs loaded into the first storage unit; a load control unit that controls loading of the programs into the respective first storage unit of the plurality of control devices; a second storage unit that stores the programs; and a failure detection unit that detects a failure in at least one of control devices out of the plurality of control devices. The programs include autonomous driving programs of the vehicle and other programs different from the autonomous driving programs. When a failure is detected, the load control unit unloads at least some of the other programs from the first storage unit of a normal control device out of the plurality of control devices, and loads the autonomous driving program corresponding to that loaded in the first storage unit of a failed control device from the second storage unit into the first storage unit of the normal control device.

According to the autonomous driving control device in this aspect, when a failure is detected, at least some of the other programs are unloaded from the first storage unit of a normal control device out of the plurality of control devices, and the autonomous driving program loaded in the first storage unit of the failed control device is loaded from the second storage unit into the first storage unit of the normal control device. Thus, the autonomous driving program that has been executed in the failed control device can be executed in the normal control device, thereby suppressing a decrease in the continuity of that program. No devices other than the normal control device and the failed control device are needed to continuously execute the autonomous driving program that has been executed in the failed control device. This makes it possible to suppress upsizing and increase of power consumption of the autonomous driving control device.

The present disclosure can be implemented in various modes other than the autonomous driving control device. For example, the present disclosure can be implemented in modes such as a method for autonomous driving control of vehicles, a computer program for implementing the method, a storage medium storing the computer program, and others.

A. First Embodiment

A1. Device Configuration:

An autonomous driving control device 10 in a first embodiment shown in FIG. 1 is installed in a vehicle to control autonomous driving of the vehicle. The autonomous driving control device 10 implements autonomous driving at a predetermined number of levels as driving automation levels. In the present embodiment, the autonomous driving control device 10 controls the driving of the vehicle at level 0, level 1, level 2, and level 3. The level 0 is a level at which the driver performs main controls for running of the vehicle. The main controls refer to controls of acceleration, deceleration, steering, and others of the vehicle. Level 1 is a level at which only a single one of the main controls is automatically performed. Level 2 is a level at which two or more of the main controls can be executed at the same time in a situation where the driver can continuously monitor the running state of the vehicle and perform an operation by himself/herself as necessary. In the present embodiment, at level 2, it is detected that the driver is continuously monitoring the running state of the vehicle and perform an operation by himself/herself as necessary by detecting that the driver is holding the steering wheel of the vehicle. Level 3 is a level at which two or more of the main controls can be executed at the same time in a situation where the driver can perform an operation only under limited conditions. The levels 0 to 3 may be the same as the levels 0 to 3 that are defined by U.S. Department of Transportation Road Traffic Safety Administration (NHTSA), for example.

The autonomous driving control device 10 includes a first control device 100, a second control device 200, a first storage part 300, a second storage part 400, a load control unit 510, and a failure detection unit 520. The first control device 100 includes a CPU 110 and a RAM 120. In the present embodiment, the first control device 100 is formed as an electronic control unit (ECU). In normal times, the RAM 120 has a first autonomous driving program (hereinafter, also called "first AD program") P1A loaded therein. By executing this program, the CPU 110 serves as a first autonomous driving functional unit (hereinafter, also called "first AD functional unit"). Similarly, in normal times, the RAM 120 has a first multimedia program (hereinafter, also called "first MM program") P1M loaded therein. By executing this program, the CPU 110 serves as a first multimedia functional unit (hereinafter, also called "first MM functional unit") 112. In the present embodiment, the normal times refers to a situation in which no failure occurs in the first control device 100 or the second control device 200.

The first AD functional unit 111 is a functional unit for executing autonomous driving. Specifically, the first AD functional unit 111 performs image recognition based on captured images obtained by, out of stereo cameras included in the vehicle, a right camera on the right side as seen in a moving direction of the vehicle, and detects the type and size of a preceding vehicle, pedestrians, obstacles, and others.

The first MM functional unit 112 is a functional unit for implementing the multimedia function. Specifically, the first MM functional unit 112 controls an audio device 620 included in the vehicle.

The second control device 200 is configured in the same manner as the first control device 100. Specifically, the second control device 200 includes a CPU 210 and a RAM 220. The RAM 220 has a second autonomous driving program (hereinafter, also called "second AD program") P2A loaded therein. By executing this program, the CPU 210 serves as a second autonomous driving functional unit (hereinafter, also called "second AD functional unit") 211. Similarly, in normal times, the RAM 220 has a second multimedia program (hereinafter, also called "second MM program") P2M loaded therein. By executing this program, the CPU 210 serves as a second multimedia functional unit (hereinafter, also called "second MM functional unit") 212.

The second AD functional unit 211 is a functional unit for executing autonomous driving. Specifically, the second AD functional unit 211 performs image recognition based on captured images obtained by, out of the stereo cameras included in the vehicle, a left camera on the left side as seen in the moving direction of the vehicle, and detects the type and size of a preceding vehicle, pedestrians, obstacles, and others.

The second MM functional unit 212 is a functional unit for implementing multimedia functions. Specifically, the second MM functional unit 212 controls a navigation device 630 included in the vehicle. The first control device 100 and the second control device 200 are powered by different power source systems. Alternatively, the first control device 100 and the second control device 200 may be powered by the same power source system.

The first storage part 300 and the second storage part 400 have the first AD program P1A, the second AD program P2A, the first MM program P1M, and the second MM program P2M stored therein in advance. The first storage part 300 is connected to the first control device 100. The programs stored in the first storage part 300 can be loaded into the RAM 120 of the first control device 100. Similarly, the second storage part 400 is connected to the second control device 200. The programs stored in the second storage part 400 can be loaded into the RAM 220 of the second control device 200.

The first MM program P1M and the second AD program P2A are programs having the similar amount of data. Similarly, the second MM program P2M and the first AD program P1A are programs having the similar amount of data. The first MM program P1M and the second MM program P2M falls under subordinate concepts of "other programs" in the present disclosure.

The load control unit 510 controls loading and unloading of programs into and from the RAM 120 of the first control device 100, and controls loading and unloading of programs into and from the RAM 220 of the second control device 200. In normal times, when the ignition of the vehicle is turned on, the load control unit 510 loads the first AD program P1A and the first MM program P1M into the RAM 120 of the first control device 100. The load control unit 510 also loads the second AD program P2A and the second MM program P2M into the RAM 220 of the second control device 200. In an autonomous driving control process described later, when a failure is detected in the first control device 100 or the second control device 200, the load control unit 510 reads programs different from the programs in normal times from the first storage part 300 or the second storage part 400 and loads the same into the RAM 120 or the RAM 220.

The failure detection unit 520 detects a failure in each of the first control device 100 and a failure in the second control device 200. The failure detection unit 520 regularly performs communication (as a watch-dog) with the first AD functional unit 111 of the first control device 100 to detect the normality of the first control device 100. When there is no response from the first MM functional unit 112, the failure detection unit 520 detects that the first control device 100 has failed. Similarly, the failure detection unit 520 regularly performs communication with the second AD functional unit 211 of the second control device 200 to detect the normality of the second control device 200. When there is no response from the second AD functional unit 211, the failure detection unit 520 determines that the second control device 200 is failed.

In the present embodiment, the load control unit 510 and the failure detection unit 520 are implemented by single ECUs different from the first control device 100 and the second control device 200. The load control unit 510 and the failure detection unit 520 may be different from each other and may be implemented by ECUs different from the first control device 100 and the second control device 200.

Although not illustrated, the first storage part 300 and the second storage part 400 have stored in advance programs that are intended to implement autonomous driving and are different from the first AD program P1A and the second AD program P2A. By executing these programs, the CPU 110 and the CPU 210 also serve as a functional unit that implements a function for autonomous driving other than a function for performing image recognition based on captured images obtained by the stereo cameras (hereinafter, also called "autonomous driving main control unit").

The autonomous driving control device 10 is electrically connected to a sensor 610 and is configured to receive a signal of results of detection by the sensor 610. Examples of the sensor 610 include a vehicle velocity sensor, an acceleration sensor, a global navigation satellite system (GNSS) sensor, a stereo camera, a millimeter wave radar, Light Detection And Ranging or Laser Imaging Detection And Ranging (LiDAR), a yaw rate sensor, a steering angle sensor, a handle sensor, and others. The handle sensor is a sensor for detecting whether the driver is holding the steering wheel.

The autonomous driving control device 10 is electrically connected to an engine ECU 710, a brake ECU 720, and a steering ECU 730. The engine ECU 710 controls operations of an engine (not illustrated). Specifically, the engine ECU 710 controls various actuators to control opening/closing operations of a throttle valve, ignition operation of an ignitor, opening/closing operations of an intake valve, and others. The brake ECU 720 controls a brake mechanism not illustrated. The brake mechanism includes a device group (actuators) relating to brake control such as a sensor, a motor, a valve, and a pump. The brake ECU 720 determines a braking timing and braking amount (the amount of brake application), and controls the devices constituting the brake mechanism to obtain the determined braking amount at the determined timing. The steering ECU 730 controls a not-illustrated steering mechanism. The steering mechanism includes a device group (actuators) relating to steering such as a power steering motor. The steering ECU 730 determines the amount of steering (steering angle) based on measurement values obtained from the yaw rate sensor and the steering angle sensor, and controls the devices constituting the steering mechanism to produce the determined amount of steering. The autonomous driving main control unit controls the engine ECU 710, the brake ECU 720, and the steering ECU 730 to implement autonomous driving.

In the autonomous driving control device 10 configured as described above, executing an autonomous driving control process described later makes it possible to, even if the first control device 100 or the second control device 200 has failed, suppress a decrease in the continuity of the autonomous driving function and suppress upsizing of the autonomous driving control device 10 and an increase in power consumption.

The RAM 120 and the RAM 220 corresponds to subordinate concepts of a first storage unit in the present disclosure. In addition, the CPUs 110 and 210 correspond to subordinate concepts of a processing unit in the present disclosure. The first storage part 300 and the second storage part 400 correspond to subordinate concepts of a second storage unit in the present disclosure.

Figure 2:
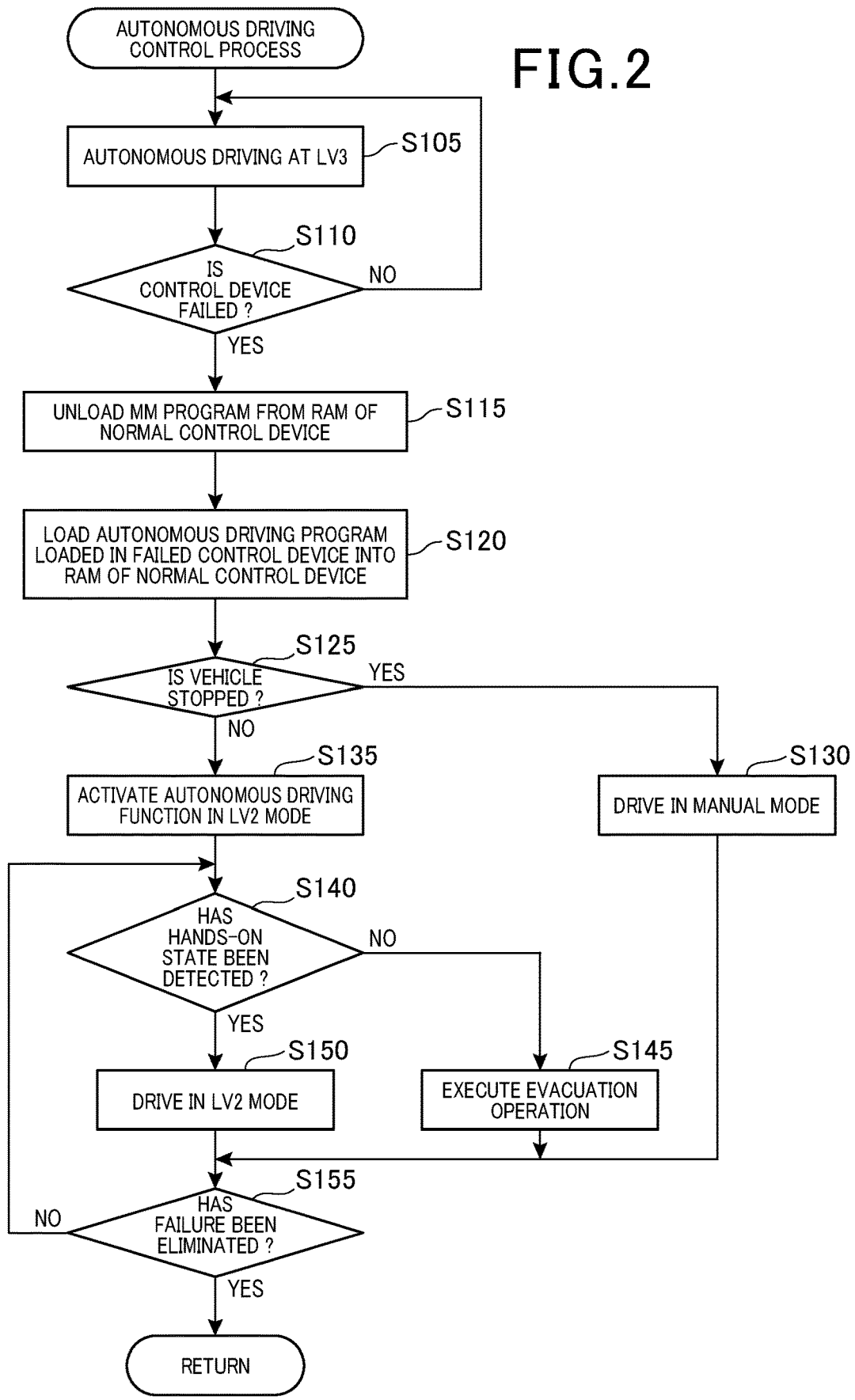
FIG. 2 is a flowchart of a procedure for an autonomous driving control process in a first embodiment.

A2. Autonomous Driving Control Process:

An autonomous driving control process shown in FIG. 2 is executed when the ignition of the vehicle is turned on and the driver specifies autonomous driving at the level 3. In the present embodiment, autonomous driving at level 3 is specified by the driver operating a predetermined switch prepared on an instrument panel or the like or by operating a menu screen on the display. In a configuration of the vehicle that has an interface for sound input, the driver may specify autonomous driving at level 3 by uttering a predetermined sound.

The first AD functional unit 111, the second AD functional unit 211, and the autonomous driving main control unit described above execute the autonomous driving at level 3 (LV3) (step S105).

The failure detection unit 520 determines whether a failure has been detected in the first control device 100 or the second control device 200 (step S110). When it is not determined that a failure is detected in the first control device 100 or the second control device 200 (step S110: NO), step S105 described above is executed. In contrast, when it is determined that a failure is detected in the first control device 100 or the second control device 200 (step S110: YES), the load control unit 510 unloads the multimedia program from the RAM of the normal control device (step S115).

The load control unit 510 loads the autonomous driving program corresponding to that loaded in the RAM of the failed control device from the storage unit into the RAM of the normal control device (step S120).

Figure 3:
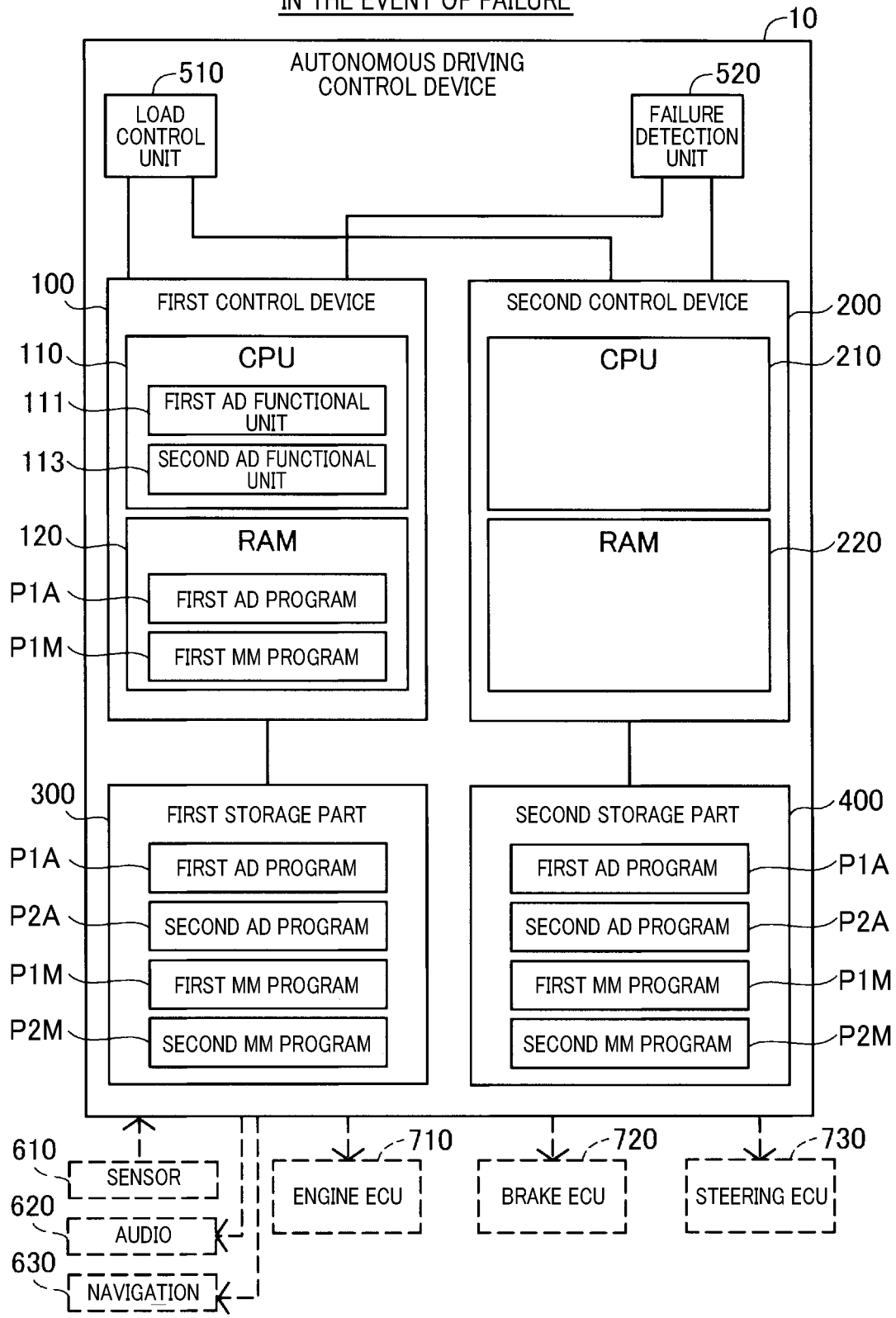
FIG. 3 is a block diagram illustrating a configuration of the autonomous driving control device in the event of a failure in a second control device.

For example, in the state shown in FIG. 1, in the event of a failure in the second control device 200, after steps S115 and S120 are executed, as shown in FIG. 3, the first MM program P1M shown in FIG. 1 is unloaded from the RAM 120, and instead of this, the second AD program P2A is loaded into the RAM 120 from the first storage part 300. Accordingly, the CPU 110 serves as the first AD functional unit 111 and also serves as a second AD functional unit 113.

As shown in FIG. 2, the autonomous driving main control unit determines whether the vehicle is stopped based on a signal obtained from the sensor 610 (for example, a signal indicative of the velocity of the vehicle) (step S125). The autonomous driving main control unit executing steps S125 and S135 to S144 is implemented by the normal CPU. When determining that the vehicle is stopped (step S125: YES), the autonomous driving main control unit switches a driving mode from an autonomous driving mode to a manual mode (step S130). In the present embodiment, the manual mode means driving at level 0. Therefore, the automation level changes from level 3 to level 0. Switching the driving mode from the autonomous driving mode to the manual mode during the stoppage of the vehicle in this manner allows manual driving from the beginning of the next running of the vehicle. Thus, it is possible to improve the safety of the running vehicle in a state where, in the event of a failure in a control device, the remaining control device is likely to also fail for the same reason or in a state where there will no longer exist any normal control device if the remaining control device also fails in the future.

When it is not determined in step S125 that the vehicle is stopped (step S125: NO), the autonomous driving main control unit activates the autonomous driving function of the vehicle at level 2 (LV2) (step S135).

The autonomous driving main control unit determines whether a hands-on state has been detected, that is, the driver has held the steering wheel within a predetermined time based on a result of detection by the sensor 610 (step S140). When not determining that a hands-on state has been detected (step S140: NO), the autonomous driving main control unit causes the vehicle to perform an evacuating operation (step S145). In the present embodiment, the evacuating operation means an operation of gradually decreasing the velocity of the vehicle. The autonomous driving main control unit controls the brake ECU 720 to implement the evacuating operation. When no hands-on state has been detected, there is a high possibility that the driver cannot continuously monitor the running state of the vehicle. Thus, driving at level 2 may not be maintained and the driver cannot manually drive the vehicle even when the level shifts to level 1 or level 0. Therefore, the evacuating operation is performed if no hands-on state has been detected within a predetermined period of time. The evacuating operation of gradually decreasing the velocity of the vehicle suppresses a decrease in the safety of driving the vehicle.

When determining in step S140 that a hands-on state has been detected (step S140: YES), the autonomous driving main control unit executes the autonomous driving at level 2 (step S150). When a control device has failed and the driver can continuously monitor the running state of the vehicle, performing autonomous driving at level 2 makes it possible to immediately transfer the authority for driving to the driver because the driver is performing monitoring in a state where, in the event of a failure in a control device, the remaining control device is likely to also fail for the same reason or in a state where there will no longer exist any normal control device if the remaining control device also fails in the future. This improves the safety of the running vehicle.

The autonomous driving main control unit determines whether the failure in the control device has been eliminated (step S155). When not determining that the failure has been eliminated (step S155: NO), the autonomous driving main control unit returns to step S140. In contrast, when determining that the failure has been eliminated (step S155: YES), the autonomous driving main control unit returns to step S105.

According to the autonomous driving control device 10 in the first embodiment described above, when a failure is detected in the first control device 100 or the second control device 200, the multimedia program is unloaded from the RAM of the normal control device, and the autonomous driving program corresponding to that loaded in the RAM of the failed control device is loaded from the storage unit into the RAM of the normal control device. Accordingly, the autonomous driving program having been executed in the failed control device can be continuously executed on the normal control device. Therefore, it is possible to suppress a decrease in the continuity of the autonomous driving function that is implemented by the autonomous driving program. In addition, no dedicated ECU is prepared to maintain the autonomous driving function, which suppresses upsizing and increase in power consumption of the autonomous driving control device 10.

The autonomous driving programs for implementing different functions are loaded into the normal control device and the failed control device, which reduces the amount of data of the autonomous driving program to be loaded into the RAM of the normal control device in step S120 and shorten the time taken for loading, as compared with a configuration in which the autonomous driving program for implementing the same function is redundantly loaded into the normal control device and the failed control device in normal times.

When the normal control device executes the autonomous driving program loaded in the RAM of the failed control device, the normal control device executes the autonomous driving at level 2 that is the driving automation level. Accordingly, it is possible to directly transfer the authority for driving to the driver in a state where, in the event of a failure in a control device, the remaining control device is likely to be also failed for the same reason or in a state where there will no longer exist any normal control device if the remaining control device also becomes failed in the future. This improves the safety of the running vehicle.

The evacuating operation is performed if no hands-on state has been detected within a predetermined period of time after detection of a failure and the activation of the autonomous driving function at level 2. Thus, when the driving at level 2 cannot be maintained because there is a high possibility that the driver is not in a state capable of continuously monitoring the running state of the vehicle, and when there is a high possibility that the driver cannot drive manually even if the driving level shifts to level 1 or level 0, it is possible to gradually decrease the velocity of the vehicle and suppresses a decrease in the safety of driving the vehicle.

The driving mode is switched from the autonomous driving mode to the manual mode when the vehicle is stopped in the event of a failure in a control device, and thus the vehicle can be run by manual driving from the beginning the next time. Thus, it is possible to improve the safety of the vehicle running the next time in a state where, in the event of a failure in a control device, the remaining control device is likely to also fail for the same reason or in a state where there will no longer exist any normal control device if the remaining control device also fails in the future.

B. Second Embodiment

Figure 4:
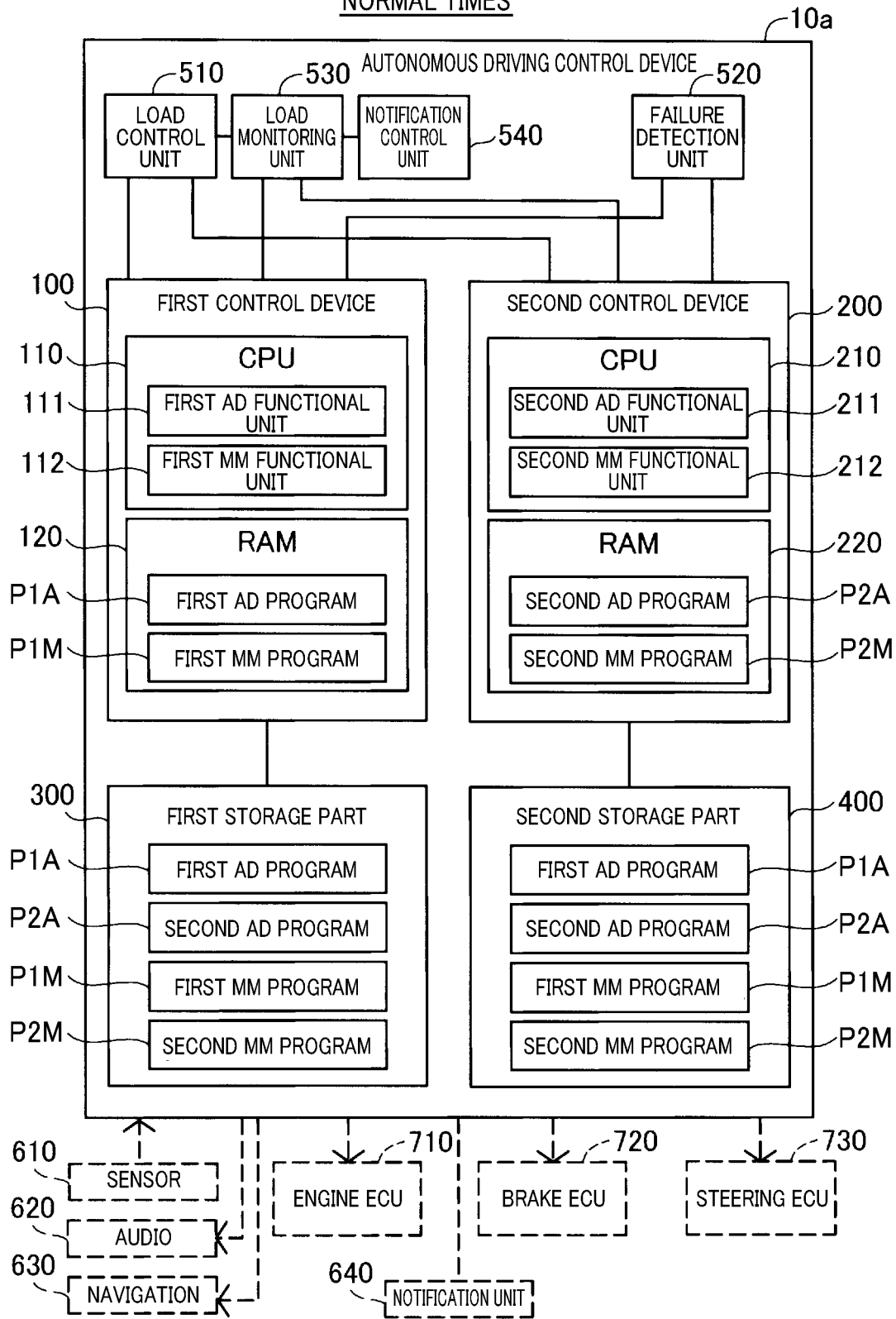
FIG. 4 is a block diagram illustrating a configuration of an autonomous driving control device in a second embodiment.

As shown in FIG. 4, an autonomous driving control device 10a of a second embodiment is different from the autonomous driving control device 10 of the first embodiment in including a load monitoring unit 530 and a notification control unit 540 and in being electrically connected to a notification unit 640. In other respects, the autonomous driving control device 10a of the second embodiment is configured in the same manner as the autonomous driving control device 10 of the first embodiment, and thus identical components will be given identical reference signs and detailed descriptions thereof will be omitted.

The load monitoring unit 530 monitors whether loading of a program by the load control unit 510 from the storage unit to the RAM has succeeded. Specifically, if the second control device 200 has failed and the second AD program P2A is loaded into the RAM 120 of the first control device 100 as in the first embodiment, the load monitoring unit 530 communicates with the second AD functional unit 113 of the CPU 110 shown in FIG. 3 to monitor whether loading of the second AD program P2A has succeeded.

The notification control unit 540 controls notification by the notification unit 640 that issues notification to a passenger of the vehicle (including a driver). In the present embodiment, the notification unit 640 includes a monitor display and a speaker. Detailed operations of the notification control unit 540 and the notification unit 640 will be described later. The load monitoring unit 530 and the notification control unit 540 are implemented by the same ECUs as the ECUs that implement the load control unit 510 and the failure detection unit 520. The load monitoring unit 530 and the notification control unit 540 may be implemented by ECUs different from the ECUs that implement the load control unit 510 and the failure detection unit 520. In addition, the load monitoring unit 530 and the notification control unit 540 may be implemented by different ECUs.

Figure 5:
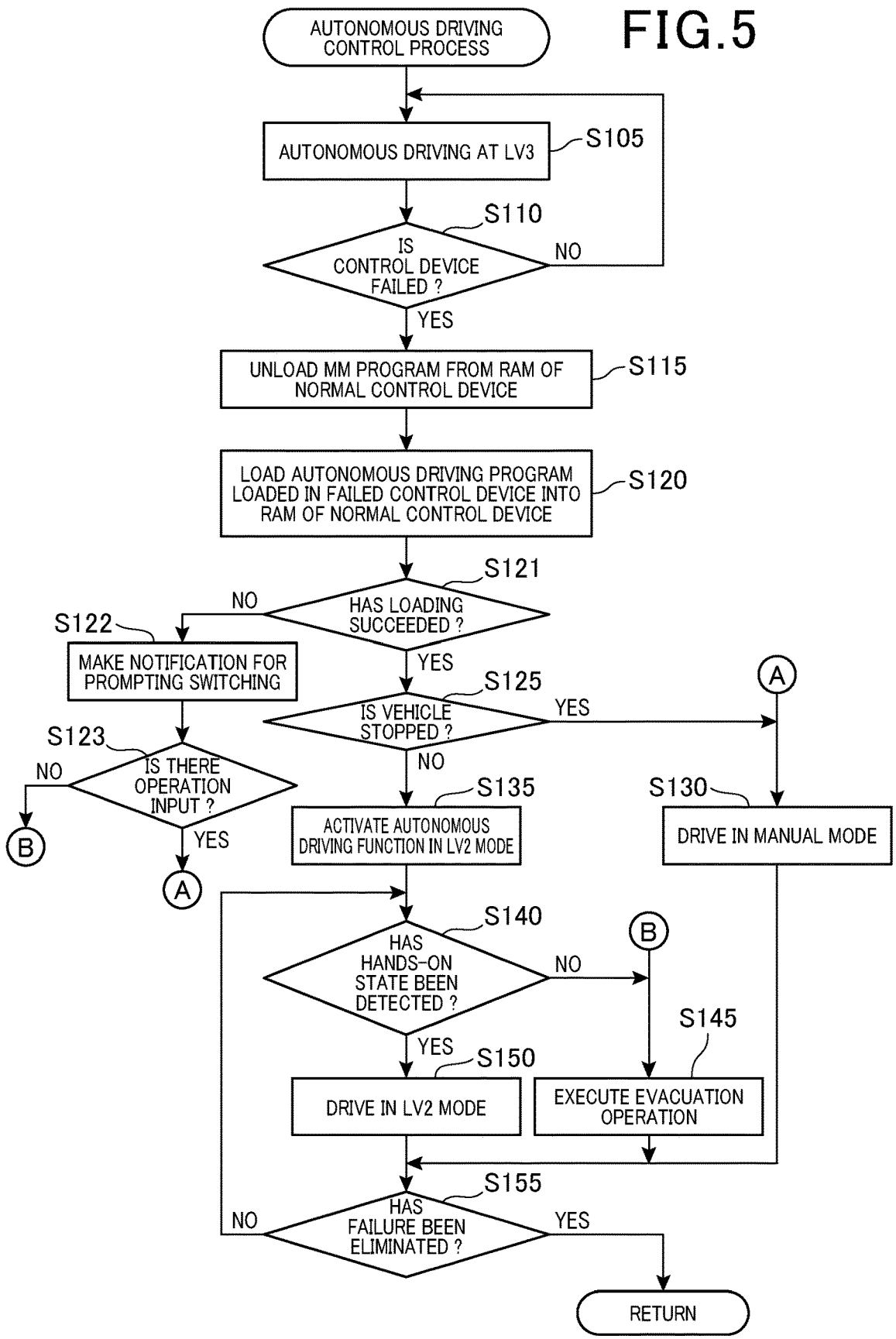
FIG. 5 is a flowchart of a procedure for an autonomous driving control process in the second embodiment.

An autonomous driving control process in the second embodiment shown in FIG. 5 is different from the autonomous driving control process in the first embodiment shown in FIG. 2 in executing steps S121, S122, and S123. Other steps in the autonomous driving control process in the second embodiment are the same as those in the autonomous driving control process in the first embodiment, and thus identical steps will be given identical reference signs and detailed descriptions thereof will be omitted.

After execution of step S120, the load monitoring unit 530 determines whether loading of an autonomous driving program into the RAM of the normal control device in step S120 has succeeded (step S121). When it is determined that the loading has succeeded (step S121: YES), the above described step S125 is executed.

On the other hand, when it is not determined that the loading has succeeded (step S121: NO), the notification control unit 540 causes the notification unit 640 to issue a notification for prompting switching from autonomous driving to manual driving (step S122). By execution of step S122, the notification unit 640 causes a monitor display not shown to display a message for prompting manual driving on the monitor display not shown, and outputs a sound for prompting manual driving from a speaker. Instead of or in addition to the message, the notification unit 640 may display a predetermined symbol or icon. Instead of or in addition to the sound for prompting manual driving, the notification unit 640 may output a predetermined warning sound. The notification unit 640 may omit either one of the message display and the sound output.

The autonomous driving main control unit determines whether there has been an input of an operation by the driver (step S123). The input of an operation refers to an input of an operation on a steering wheel, an accelerator pedal, or a brake pedal, for example. When it is determined that there has been an input of an operation (step S123: YES), above described step S130 is executed. In this case, therefore, the driving mode is switched to manual driving. In contrast to this, when it is not determined that there has been an input of an operation (step S123: NO), step S145 is executed. In this case, therefore, the evacuating operation is executed. If there has been no input of an operation regardless of the notification for prompting manual driving in step S122, it is considered that the driver is not in a situation capable of driving. In this case, therefore, the evacuating operation is performed without switching to manual driving, to thereby operate the vehicle in a safer manner.

The autonomous driving control device 10a in the second embodiment described above produces the same advantageous effects as those of the autonomous driving control device 10 in the first embodiment. In addition, when it is determined that the loading of the autonomous driving program corresponding to that loaded in the RAM of the failed control device into the RAM of the normal control device has not succeeded, the notification control unit 540 causes the notification unit 640 to issue a notification for prompting a passenger to switch to manual driving so that the passenger can switch to manual driving in response to the notification. Therefore, in a state where, in the event of a failure in a control device, the remaining control device is likely to also fail for the same reason or in a state where there will no longer exist any normal control device if the remaining control device also fails in the future, it is possible to switch to safer manual driving and improve the safety of the running vehicle.

When there has been an input of an operation by the passenger, the driving mode of the vehicle is switched from the autonomous driving mode to the manual driving mode, which suppresses the passenger from switching to the manual driving mode even though manual driving is not allowed, thereby making it possible to operate the vehicle in a safer manner. When it is determined that the loading of the autonomous driving program from the RAM of the failed control device into the RAM of the normal control device has not succeeded, the vehicle is caused to perform the evacuating operation. Accordingly, the autonomous driving program loaded in the failed control device is not executed in any of the control devices. This makes it possible to suppress a decrease in the safety of driving the vehicle even if normal autonomous driving can no longer be continued.

C. Third Embodiment

Figure 6:
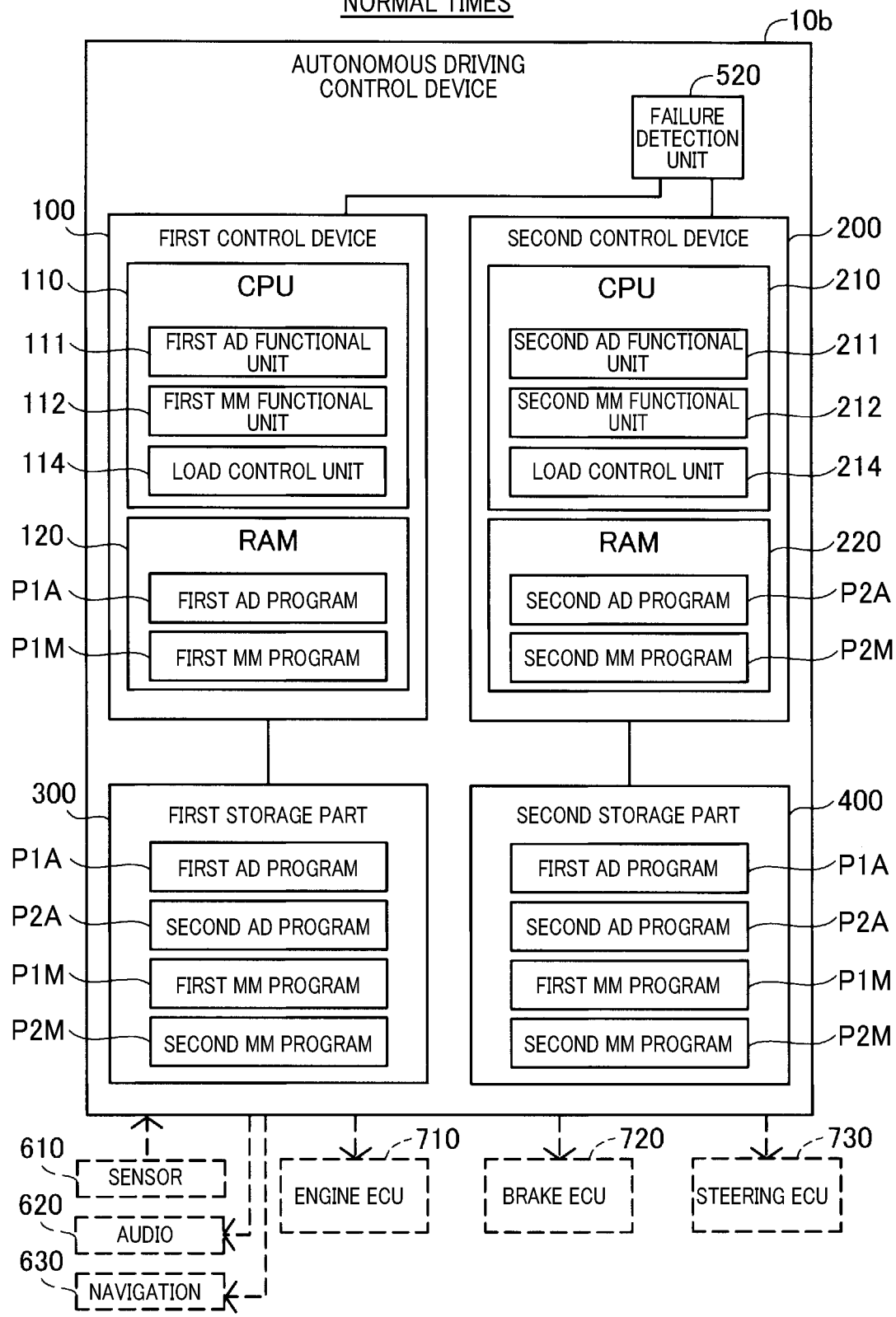
FIG. 6 is a block diagram illustrating a configuration of an autonomous driving control device in a third embodiment.

As shown in FIG. 6, an autonomous driving control device 10b in a third embodiment is different from the autonomous driving control device 10 shown in FIG. 1 in that the load control unit 510 is omitted, the CPU 110 of the first control device 100 serves as a load control unit 114, and the CPU 210 of the second control device 200 serves as a load control unit 214. Other components of the autonomous driving control device 10b in the third embodiment are the same as those of the autonomous driving control device 10 in the first embodiment, and identical reference signs will be given to identical components and detailed descriptions thereof will be omitted.

The load control unit 114 is implemented by loading a control program not shown stored in advance in a first storage part 300 into a RAM 120 and executing this control program by a CPU 110. The load control unit 114 controls loading of the program from the first storage part 300 into the RAM 120.

The load control unit 214 is implemented by loading a control program not shown stored in advance in a second storage part 400 into a RAM 220 and executing this control program by a CPU 210. The load control unit 214 controls the loading of the program from the second storage part 400 into the RAM 220.

A procedure for the autonomous driving control process in the third embodiment is the same as the procedure for the autonomous driving control process in the first embodiment. However, steps S115 and S120 executed by the load control unit 510 in the first embodiment are executed by the load control unit included in the normal control device between the load control units 114 and 214.

The thus configured autonomous driving control device 10b in the third embodiment configured as described above has the same advantageous effects as those of the autonomous driving control device 10 in the first embodiment.

D. Fourth Embodiment

Figure 7:
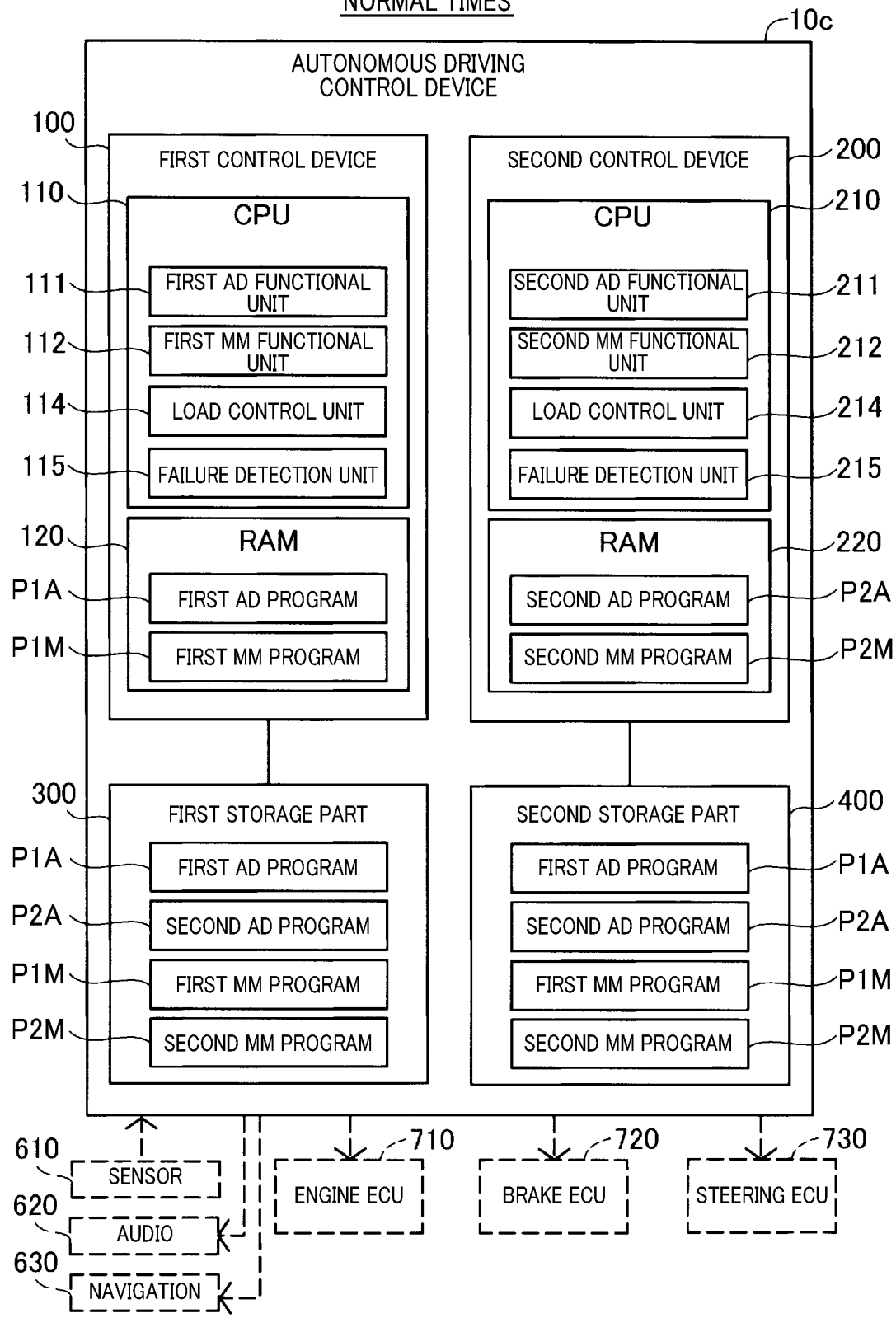
FIG. 7 is a block diagram illustrating a configuration of an autonomous driving control device in a fourth embodiment.

As shown in FIG. 7, an autonomous driving control device 10c in a fourth embodiment is different from the autonomous driving control device 10 shown in FIG. 1 in that the load control unit 510 and the failure detection unit 520 are omitted, the CPU 110 of the first control device 100 serves as a load control unit 114 and a failure detection unit 115, and the CPU 210 of the second control device 200 serves as a load control unit 214 and a failure detection unit 215. Other steps in the autonomous driving control process in the fourth embodiment are the same as those in the autonomous driving control process in the first embodiment, and thus identical steps will be given identical reference signs and detailed descriptions thereof will be omitted.

The load control unit 114 is the same as the load control unit 114 in the second embodiment. The load control unit 214 is the same as the load control unit 214 in the second embodiment. Thus, detailed descriptions of the load control unit 114 and the load control unit 214 will be omitted.

The failure detection unit 115 is implemented by loading a control program stored in advance in the first storage part 300 into the RAM 120 and executing this control program by the CPU 110. The failure detection unit 115 detects a failure in the first control device 100. Specifically, like the failure detection unit 520 in the first embodiment, the failure detection unit 115 regularly communicates with the first AD functional unit 111 of the first control device 100 to detect normality of the first control device 100.

The failure detection unit 215 is implemented by loading a control program stored in advance in the second storage part 400 into the RAM 220 and executing this control program by the CPU 210. The failure detection unit 215 detects a failure in the second control device 200. Specifically, like the failure detection unit 520 in the first embodiment, the failure detection unit 215 regularly communicates with the second AD functional unit 211 of the second control device 200 to detect normality of the second control device 200.

The thus configured autonomous driving control device 10c in the fourth embodiment has the same advantageous effects as those of the autonomous driving control device 10 in the first embodiment.

E. Other Embodiments

E1. Another Embodiment 1:

In the foregoing embodiments, among the autonomous driving programs, emergency evacuation programs may be loaded into both the RAM 120 of the first control device 100 and the RAM 220 of the second control device 200 in normal times. The emergency evacuation programs apply to programs for executing emergency operations of the vehicle such as a program for implementing autonomous emergency braking (AEB) and a program for implementing a lane departure suppressing operation. According to this configuration, steps S115 and S120 are executed so that the emergency evacuation programs can be executed to improve safety even in a period of time from the occurrence of a failure in a control device to the loading of the autonomous driving program into the RAM of the normal control device.

E2. Another Embodiment 2:

In the foregoing embodiments, among the programs loaded into the RAM 120 and the RAM 220, instead of the multimedia programs such as the first MM program P1M and the second MM program P2M, other arbitrary types of programs different from the autonomous driving programs (in other words, programs not directly relating to autonomous driving) may be loaded. Specifically, examples of those programs include internet browser programs, agent programs for executing internet search or the like, and programs for controlling the vehicle body. The programs for controlling the vehicle body apply to a program for controlling power windows, a program for switching headlights, a program for controlling an air conditioner, and others. According to this configuration as well, it is possible to produce the same advantageous effects as those of the foregoing embodiments. In addition, instead of the multimedia programs such as the first MM program P1M and the second MM program P2M, autonomous driving programs different from the first AD program P1A and the second AD program P2A (in other words, programs that are the same in type as but are different from the first AD program P1A and the second AD program P2A) may be loaded.

For example, as shown in FIG. 8, in normal times, a third AD program P3A and a fifth AD program P5A may be loaded into the RAM 120 of the first control device 100 and a fourth AD program P4A and a sixth AD program P6A may be loaded into the RAM 220 of the second control device 200. The third AD program P3A and the fourth AD program P4A are autonomous driving programs for use in the autonomous driving at level 2. On the other hand, the fifth AD program P5A and the sixth AD program P6A are autonomous driving programs for use in the autonomous driving at level 3. In this configuration, in the event of a failure in the second control device 200, the fifth AD program P5A may be unloaded from the RAM 120 of the first control device 100 and the fourth AD program P4A may be loaded into the RAM 120 of the first control device 100. In this configuration, after the occurrence of the failure in the second control device 200, the autonomous driving programs at level 2 (the third AD program P3A and the fourth AD program P4A) are loaded into the RAM 120 so that the autonomous driving at level 2 can be executed.

E3. Another Embodiment 3:

In the foregoing embodiments, in step S115 of the autonomous driving control process, all the multimedia programs are unloaded from the RAM of the normal control device, but the present disclosure is not limited to this. When the RAM of the normal control device has sufficient free space, only some of the multimedia programs may be unloaded from the RAM of the normal control device and the remaining programs may be left in the RAM of the normal control device. That is, in general, in step S115, at least some of the multimedia programs may be unloaded from the RAM of the normal control device.

In addition, when the RAM of the normal control device has sufficient free space, the multimedia programs may not necessarily be unloaded. Without unloading of the multimedia programs, the normal control device has the autonomous driving programs and the multimedia programs originally loaded therein and has the autonomous driving programs corresponding to those in the abnormal control device so that the CPU of the normal control device may not be capable of processing these programs. In this case, the processing of the multimedia programs originally in the normal control device can be stopped.

E4. Another Embodiment 4:

In the foregoing embodiments, the autonomous driving programs loaded into the RAM 120 and the RAM 220 are programs for performing image recognition based on captured images obtained from either one of stereo cameras in the vehicle and detecting the type and size of a preceding vehicle, pedestrians, obstacles, and the like. However, the present disclosure is not limited to this. For example, a program for performing image recognition based on captured images obtained from both of stereo cameras may be loaded into the RAM 120, and a program for performing image recognition based on captured images obtained from both the stereo cameras and specifying obstacles using results of detection by another sensor, for example, a millimeter wave radar or LiDAR, and a program for calculating the amount of steering and the amount of braking for avoiding the obstacles may be loaded into the RAM 220.

E5. Another Embodiment 5:

In the foregoing embodiments, the control device and the storage unit are each provided in a dual system. However, the present disclosure is not limited to the dual systems but may include triple or more multiple systems. In this case, it may be decided in advance, in the event of a failure in any of the control devices, into the RAM of which control device the autonomous driving program loaded in the RAM of the failed control device are to be loaded. In addition, in the event of a failure in any of the control devices, for example, the control devices including the RAM that has free space capable of loading the autonomous driving program from the RAM of the failed control device may be extracted from the normal control devices, and the autonomous driving program loaded in the RAM of the failed control device may be loaded into, out of these extracted control devices, the control device with a lower process load on the CPU. The "RAMs having free space capable of loading the autonomous driving program from the RAM of the failed control device" means the RAMs that can ensure such free space by unloading another program such as the multimedia program from the own RAMs.

E6. Another Embodiment 6:

In the foregoing embodiments, in normal times, the RAMs 120 and 220 of the two control devices 100 and 200 have respectively the autonomous driving programs and the multimedia programs loaded therein. However, the present disclosure is not limited to this. For example, in normal times, the RAM 120 may have the autonomous driving program and the multimedia program loaded therein, and the RAM 220 may have only the autonomous driving program loaded therein. In this configuration, in the event of a failure in the second control device 200, as in the foregoing embodiments, the multimedia program loaded in the RAM 120 can be unloaded and the autonomous driving program loaded in the RAM 220 can be loaded into the RAM 120.

For example, in normal times, the RAM 120 may have only the multimedia program loaded therein, and the RAM 220 may have the autonomous driving program and the multimedia program loaded therein. In this configuration, in the event of a failure in the second control device 200, as in the foregoing embodiments, the multimedia program loaded in the RAM 120 can be unloaded and the autonomous driving program corresponding to that loaded in the RAM 220 can be loaded into the RAM 120.

For example, in normal times, the RAM 120 may have only the multimedia program loaded therein and the RAM 220 may have only the autonomous driving program loaded therein. In this configuration, in the event of a failure in the second control device 200, as in the foregoing embodiments, the multimedia program loaded in the RAM 120 can be unloaded and the autonomous driving program corresponding to that loaded in the RAM 220 can be loaded into the RAM 120.

However, loading the autonomous driving programs into the RAM 120 and the RAM 220 as in the foregoing embodiments makes it possible to shorten the time taken for step S120 and shorten the time during which the functions implemented by the programs loaded in step S120 cannot be executed.

E7. Another Embodiment 7:

The configurations of the autonomous driving control device are not limited to the configurations of the autonomous driving control devices 10, 10a, 10b, and 10c in the foregoing embodiments but may be configured as described below, for example. In the foregoing embodiments, after execution of step S120, driving is implemented by any of the driving at the level 2, the manual driving (driving at the level 0), and the evacuating operation. Alternatively, when step S120 is normally executed, the autonomous driving may be continued at the level 3. When it is not determined in step S121 of the second embodiment that the loading has succeeded (step S121: NO), step S145 (execution of the evacuating operation) may be executed while omitting steps S122 and S123. In the second embodiment, step S130 (switching the driving mode to the manual driving) may be executed regardless of the presence or absence of an operation input while omitting step S123. In the foregoing embodiments, step S125 may be omitted. Specifically, step S135 may be executed without determination on whether the vehicle is stopped. In this configuration, the automatic running at the level 2 is implemented in a stage where, after the stoppage, the vehicle is restarted. In the foregoing embodiments, as the evacuating operation, the vehicle may be pulled over to the shoulder of the road, instead of gradually decreasing the velocity of the vehicle or in addition to gradually decreasing the velocity of the vehicle.

E8. Another Embodiment 8:

In the foregoing embodiments, some of the components implemented by hardware may be replaced with software, and in reverse, some of the components implemented by software may be replaced with hardware. For example, some of the components may be implemented by an integrated circuit, a discrete circuit, or a module with a combination of these circuits. When some or all of the functions of the present disclosure are implemented by software, the software (computer programs) can be provided in a form that is stored in computer-readable recording media. The "computer-readable recording media" include not only portable recording media such as flexible discs and CD-ROMs but also internal storage devices in computers such as various RAMs and ROMs and external storage devices fixed to computers such as hard disks. That is, the "computer-readable recording media" broadly mean arbitrary recording media that store data packets not temporarily but permanently.

The preset disclosure is not limited to the foregoing embodiments but can be implemented in various configurations without deviating from the scope of the present disclosure. For example, the technical features in the embodiments corresponding to the technical features in the aspects described in the summary section can be replaced or combined with each other as appropriate to solve some or all of the foregoing issues or to attain some or all of the foregoing advantageous effects. In addition, the technical features can be deleted as appropriate unless they are described as essential herein.

What is claimed is:

1. An autonomous driving control device to be installed and used in a vehicle, comprising:
    a first control device and a second control device that each have a first storage unit and a processing unit, the processing unit being configured to execute programs loaded into the first storage unit;
    a load control unit that controls loading of the programs into the respective first storage unit of the first and second control devices;
    second storage units, each connected to a different one of the first and second control devices, one of the second storage units connected to the first control device being configured to store the programs to be executed by the processing unit of the first control device and the programs to be executed by the processing unit of the second control device, a remainder of the second storage units connected to the second control device being configured to store the programs to be executed by the processing unit of the second control device and the programs to be executed by the processing unit of the first control device;
    a failure detection unit that detects a failure in at least one of the first and second control devices; and
    a load monitoring unit that monitors whether loading of the programs by the load control unit has succeeded, wherein:
    the programs to be executed by the processing unit of the first control device include a first autonomous driving program of the vehicle and another program different from the first autonomous driving program, and the programs to be executed by the processing unit of the second control device include a second autonomous driving program of the vehicle and another program different from the second autonomous driving program,
    when the failure is detected in one of the first and second control devices, the load control unit unloads at least some of the another program from the first storage unit of a normal control device out of the first and second control devices, and loads an autonomous driving program corresponding to that loaded in the first storage unit of the failed one of the first and second control devices, from the second storage unit connected to the normal control device into the first storage unit of the normal control device, and
    when it is detected that the loading of the autonomous driving program corresponding to that loaded in the first storage unit of the failed one of the first and second control devices into the first storage unit of the normal control device has failed, the normal control device causes the vehicle to perform an evacuating operation.

2. The autonomous driving control device according to claim 1, wherein
    the autonomous driving program loaded in the first storage unit of the failed one of the first and second control devices includes a program for implementing a function different from a function implemented by the autonomous driving program loaded in the first storage unit of the normal control device.

3. The autonomous driving control device according to claim 1, wherein, in a case the normal control device executes the autonomous driving program corresponding to that loaded in the first storage unit of the failed one of the first and second control devices, the normal control device executes autonomous driving at a level 2 that is a driving automation level.

4. The autonomous driving control device according to claim 1, further comprising:
    a notification control unit that controls a notification issued by a notification unit to a passenger of the vehicle, wherein
    when it is determined that loading of the autonomous driving program corresponding to that loaded in the first storage unit of the failed one of the first and second control devices, into the first storage unit of the normal control device has failed, the notification control unit causes the notification unit to issue a notification for prompting switching to manual driving.

5. The autonomous driving control device according to claim 4, wherein, in a case where there has been an input of a driving operation by the passenger, the normal control device switches a driving mode of the vehicle from an autonomous driving mode to a manual driving mode.

6. The autonomous driving control device according to claim 1, wherein the evacuating operation is an operation of gradually decreasing a velocity of the vehicle.

7. The autonomous driving control device according to claim 1, wherein, when the failure is detected and the vehicle is stopped, the load control unit switches a driving mode of the vehicle from an autonomous driving mode to a manual driving mode.

8. The autonomous driving control device according to claim 1, wherein, in a state without occurrence of the failure, an emergency evacuation program out of the first autonomous driving program and the second autonomous driving program is loaded into the respective first storage units of the plurality of control devices.

9. A method for autonomous driving control of a vehicle, comprising:
    a step of detecting a failure in at least one of control devices out of a first control device and second control device that are installed in the vehicle and each have a first storage unit and a processing unit configured to execute programs loaded into the first storage unit, the programs to be executed by the processing unit of the first control device include a first autonomous driving program of the vehicle and another program different from the first autonomous driving program, and the programs to be executed by the processing unit of the second control device include a second autonomous driving program of the vehicle and another program different from the second autonomous driving program;
    a step of, when the failure is detected in the one of the first and second control devices, unloading from the first storage unit of a normal control device out of the first and second control devices, at least some of other programs that are included in the programs loaded into the first storage unit and are different from autonomous driving programs of the vehicle and loading an autonomous driving program loaded in the first storage unit of a failed control device from a second storage unit connected to the normal control device into the first storage unit of the normal control device, the second storage units connected to a different one of the first and second control devices, one of the second storage units connected to the first control device being configured to store the programs to be executed by the processing unit of the first control device and the programs to be executed by the processing unit of the second control device, a remainder of the second storage units connected to the second control device being configured to store the programs to be executed by the processing unit of the second control device and the programs to be executed by the processing unit of the first control device; and a step of causing the vehicle to perform an evacuating operation when it is detected that the loading of the autonomous driving program loaded in the first storage unit of the failed control device into the first storage unit of the normal control device has failed.

10. An autonomous driving control device that is installed and used in a vehicle, comprising:

a first control device and a second control device that each have a first storage unit and a processing unit, the processing unit being configured to execute programs loaded into the first storage unit;

a load control unit that controls loading of the programs into the respective first storage units of the first and second control devices;

second storage units, each connected to a different one of the first and second control devices, one of the second storage units connected to the first control device being configured to store the programs to be executed by the processing unit of the first control device and the programs to be executed by the processing unit of the second control device, a remainder of the second storage units connected to the second control device being configured to store the programs to be executed by the processing unit of the second control device and the programs to be executed by the processing unit of the first control device;

a failure detection unit that detects a failure in at least one of the first and second control devices; and a load monitoring unit that monitors whether loading of the programs by the load control unit has succeeded, wherein the programs to be executed by the processing unit of the first control device include a first autonomous driving program of the vehicle and another program different from the first autonomous driving program, and the programs to be executed by the processing unit of the second control device include a second autonomous driving program of the vehicle and another program different from the second autonomous driving program, when the failure is detected in one of the first and second control devices, the load control unit loads an autonomous driving program loaded in the first storage unit of a failed control device out of the first and second control devices from the second storage unit connected to a normal control device into the first storage unit of the normal control device, and when it is detected that the loading of the autonomous driving program corresponding to that loaded in the first storage unit of the failed one of the first and second control devices into the first storage unit of the normal control device has failed, the normal control device causes the vehicle to perform an evacuating operation.

\* \* \* \* \*